United States Patent [19]

Gigl et al.

[11] Patent Number: 4,466,938
[45] Date of Patent: Aug. 21, 1984

[54] METHOD FOR REDUCING DAMAGE TO DIAMOND CRYSTALS DURING SINTERING

[75] Inventors: Paul D. Gigl, Worthington, Ohio; Robert L. Winegardner, Grapevine, Tex.

[73] Assignee: General Electric Company, Worthington, Ohio

[21] Appl. No.: 436,251

[22] Filed: Oct. 25, 1982

Related U.S. Application Data

[63] Continuation-in-part of Ser. No. 69,203, Aug. 23, 1979, abandoned.

[51] Int. Cl.$^3$ .............................................. C04B 35/60
[52] U.S. Cl. ...................................... 264/332; 51/307; 51/309
[58] Field of Search ................ 51/295, 307, 308, 309; 264/60, 332

[56] References Cited

U.S. PATENT DOCUMENTS

| | | | |
|---|---|---|---|
| 3,136,615 | 6/1964 | Bovenkerk et al. | 51/307 |
| 3,423,177 | 1/1969 | Bovenkerk | 23/209.01 |
| 3,609,818 | 10/1971 | Wentorf | 18/34 R |
| 3,745,623 | 7/1973 | Wentrof, Jr. et al. | 29/95 B |
| 3,895,313 | 7/1975 | Seitz | 331/94.5 D |
| 3,913,280 | 10/1975 | Hall | 51/307 |
| 4,104,441 | 8/1978 | Fedoseev et al. | 428/408 |
| 4,248,606 | 2/1981 | Bovenkerk et al. | 51/307 |
| 4,260,397 | 4/1981 | Bovenkerk | 51/307 |

OTHER PUBLICATIONS

Muskiant, S. et al., "Impact Resistance of Single Crystal and Polycrystalline Man–Made Diamonds," in *High Pressure Science and Technology*, Timmerhaus, K. D. Ed., Plenum Press, 1979.
DeVries, R. C., "Plastic–Deformation and Work Hardening of Diamond," General Electric Technical Information Series Report, 8/74.
Slack, G. A., "Advanced Materials for Optical Windows," General Electric Technical Information Series Report 79CRD071 Jun., 1979.
Seal M., "The Increasing Applications of Diamond as an Optical Material and in the Electronics Industry," *Industrial Diamond Review*, Apr., 1978.

*Primary Examiner*—Donald E. Czaja
*Assistant Examiner*—W. Thompson
*Attorney, Agent, or Firm*—Robert R. Schroeder; Douglas B. Little

[57] ABSTRACT

A process improvement is disclosed for making compacts containing diamond which reduces crystal flaws within the diamond. This is accomplished by isolating the single diamond crystals in an compressible matrix before exposing the sample to sintering conditions. One method for doing this (described with reference to FIG. 1) is embedding the diamond 14 in a mixture 16 of graphite and diamond fines. This mixture is disposed between two graphite discs 18 and 19 and two cobalt discs 22 and 23. This sub-assembly is contained within zirconium cup 10 on top of which is placed zirconium disc 12 and exposed to high pressure-high temperature sintering conditions.

6 Claims, 3 Drawing Figures

METHOD FOR REDUCING DAMAGE TO DIAMOND CRYSTALS DURING SINTERING

This is a continuation in part of application Ser. No. 69,203 filed Aug. 23, 1979 now abandoned.

DESCRIPTION

1. Technical Field

This invention is related to processes for sintering diamond. More particularly, it deals with an improved method of incorporating diamond into a compact.

2. Background

A compact is a polycrystalline mass of abrasive particles (e.g., diamond and cubic boron nitride) bonded together to form an integral, tough, coherent, high-strength mass. Diamond compacts have a concentration of diamond in excess of 70 volume percent. Representative U.S. patents on the subject of diamond compacts are: U.S. Pat. Nos. 3,136,615 (boron carbide bonding medium); 3,141,746; 3,239,321 (graphite-free diamond compact); 3,744,982 (boron alloyed diamond compact process); 3,816,085; and 3,913,280. A composite compact is a compact bonded to a substrate material, such as cemented tungsten carbide (see U.S. Pat. No. 3,745,623).

In certain diamond compacts, crystal damage occurs during sintering which can be detrimental to the usefulness of the compact (e.g., when optical clarity and high abrasion resistance are important). The damage is caused by the unequal stresses applied to the crystal surfaces during the compact synthesis. The stresses arise from the irregular contact of the diamond crystals with each other which result in intensification of the stresses at contact points between the diamond surfaces. Also, non-homogenous pressure distribution within the pressure vessel used for sintering may contribute to the damage.

Sintering is normally done by high pressure-high temperature (HP/HT) reactions with infiltrants or matrices which promote particle-to-particle bonding. Sintering of diamond by compaction at HP/HT can be accomplished, but is more difficult. There are also grown compacts which are synthesized from non-diamond carbon materials like graphite and a catalyst. Again, direct conversion of the non-diamond carbon material at extremely high pressures is possible, but is more difficult.

HP/HT apparatus for accomplishing the synthesis and sintering of diamond and CBN are described in the following references:

Spain, I.L., *High Pressure Technology*, Vol. 1, Chapter 11, Marcel Dekker, Inc., New York, 1977; and
U.S. Pat. No. 2,941,248.

Relatively large diamonds which are nearly flawless are desirable when the compact is to be applied as a heat sink or as an optical window, such as an infrared detector. The trend toward miniaturization in electronics has lead to the need for improved heat dissipating substrates for solid state devices. A diamond heat sink for an IMPATT diode oscillator for a microwave generator is discussed in Schorr, A. J., et al., "A Comprehensive Study of Diamond as a Microwave Device Heat Sink Material", *Proceedings: International Industrial Diamond Conference*, (1969). See also Seal, M., et al., "The Increasing Applications of Diamond as an Optical Material and in the Electronics Industry", *Industrial Diamond Review*, p. 130 (April, 1978).

Single crystal diamond has the highest room temperature thermal conductivity of any known material. Yet, heat is not transferred in diamond by free electrons as it is in most metals, but rather by means of lattice waves or vibrations known as phonons. The mean free distance which such a phonon travels before being attenuated by scattering is called the phonon mean free path. Thermal conductivity is directly proportional to phonon mean free path, which is on the order of 0.1–1 microns at room temperature. Phonon scattering (i.e., the shortening of the phonon mean free path) with the accompanying decrease in thermal conductivity is affected by crystal defects (e.g., crystal imperfections and impurities), crystallite size, and boundaries between crystal grains. To maximize thermal conductivity, it is desirable to minimize crystal imperfections and maximize crystallite size. Some crystal imperfections can be detected by X-ray diffraction techniques, broadening of peak width being indicative of lattice distortion.

In electronic heat sink applications, where optical clarity is not necessary, multiple layers of diamond crystals can be used. Thermal conductivity, not abrasion resistance or clarity, is the important property. Diamond-to-diamond bonding is very important to maintain grain-to-grain thermal conduction.

It has been found that during HP/HT sintering, crystallite size is reduced, indicating a damaging effect to the internal diamond structure. Plastic deformation or slip planes as well as fracture can occur in the individual crystals at relatively low pressures (10 kilobars, 1100° C.). This in effect reduces the volume of good crystallinity to a point less than the phonon mean free path and, therefore, reduces the thermal conductivity—see DeVries, R. C., "'Plastic Deformation' and 'Work Hardening' of Diamond", *Mat. Res. Bull.*, Volume 10, pp. 1193–1200, Pergamon Press, Inc., (1975).

Other electronic heat sink applications for diamond compacts are: Gunn diodes for microwave generators, solid state lasers, high power transistors, and integral circuits. The most common heat sink materials used at present are high-purity copper and polycrystalline beryllium oxide.

A good general reference on thermal conductivity is Berman, *Thermal Conduction in Solids*, Clarendon Press, Oxford, England, (1976).

The essence of this invention is the discovery of one method for reducing crystal flaws and increasing crystallite size in compacts. Some representative U.S. Patents describing modifications to compact manufacturing are: U.S. Pat. Nos. 3,816,085 (sintering under unstable conditions in which some diamond reverts to non-diamond carbon); 3,913,280 (similar to the previous patent with the addition of a sintering aid); and 4,124,401 (silicon-alloy bonded compact made in a pressure transmitting powder medium such as hexagonal boron nitride).

Also, U.S. Pat. No. 4,220,445 discloses compacts comprised of diamond, CBN, or combinations thereof bonded together with silicon and silicon carbide. They are made by infiltration of a mixture of carbon-coated abrasive and a carbonaceous material with fluid silicon under partial vacuum.

U.S. Pat. Nos. 3,745,623 (Example 2) and 3,609,818 (Examples 1-2) disclose a compact made by mixing graphite with diamond.

DISCLOSURE OF INVENTION

In order to reduce defect formation while maintaining high strength and abrasion resistance, the pressure gradients on individual diamond crystals must be reduced but not at the expense of bonding. This can be done by isolating and protecting the individual crystals with a deformable material which can conform to the crystal shapes before sintering and during compression. This deformable material or compressible matrix could be a form of carbon such as graphite, which would distribute the stresses evenly to the crystals. It could also be cobalt or cemented tungsten carbide powder. Graphite will be converted to diamond during sintering, and thus, introduce diamond-to-diamond bonding throughout the compact.

The invention is summarized as an improved process for preparing a compact containing single crystal diamond by HP/HT sintering, wherein the improvement comprises isolating the single diamond crystals in a compressible matrix before exposing the mass of diamonds to sintering conditions. A number of ways to do this are: (1) mixing diamond crystals with graphite, amorphous carbon, cobalt or cemented tungsten carbide powders; (2) mixing diamond crystals with a mixture of diamond (or CBN) and graphite or amorphous carbon powders (filler materials which are non-reactive at the HP/HT conditions used for compacts manufacture such as tungsten carbide, silicon nitride, or silicon carbide may be added to the carbon powders); (3) forming isolated compartments in a graphite block or disc for each diamond crystal; and (4) a combination of (1), (2) and (3). Method (3) could also be performed using the carbide forming transition metals (e.g., iron, nickel, cobalt, titanium, zirconium). Filters are not recommended in applications where high thermal conductivity or strength is desired.

The diamond plus carbon matrix is placed in a suitable high pressure device which can obtain diamond stable conditions (e.g., 52 Kbar at 1400° C.–65 Kbar at 1700° C.). A catalyst (e.g., single metal or alloy of iron, cobalt, nickel, or chromium) would normally be present to promote the conversion of the non-diamond carbon to diamond and aid in the sintering of the entire mass.

DETAILED DESCRIPTION OF THE INVENTION

Figure 1:
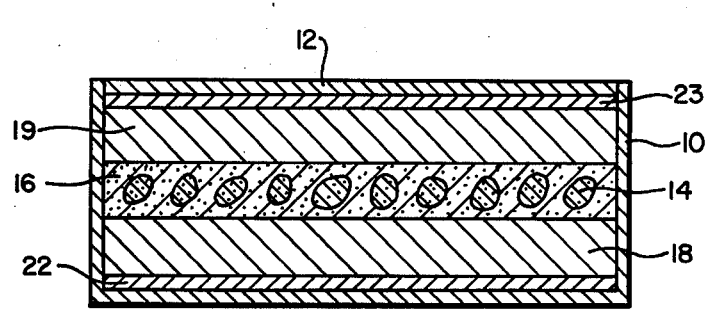
FIG. 1 represents a sectional view of a sub-assembly for HP/HT processing.

One preferred form of a HP/HT apparatus in which the compacts of this invention may be prepared is the subject of U.S. Pat. No. 2,941,248 (incorporated herein by reference) which is called a belt apparatus. It includes a pair of opposed cemented tungsten carbide punches and an intermediate belt or die member of the same material. The die member includes an aperture in which there is positioned a reaction vessel shaped to contain a charge assembly. Between each punch and the die there is a gasket assembly comprising a pair of thermally insulating and electrically non-conducting pyrophyllite members and an intermediate metallic gasket.

The reaction vessel, in one preferred form, includes a hollow salt cylinder. The cylinder may be of another material, such as talc, which (a) is substantially unconverted during HP/Ht operation to a stronger, stiffer state (as by phase transformation and/or compaction) and (b) is substantially free of volume discontinuities occurring under the application of high temperatures and pressures, as occurs, for example with pyrophyllite and porous alumina. Materials meeting other criteria set forth in U.S. Pat. No. 3,030,662 (Col. 1, 1.59–Col. 2, 1.2, incorporated by reference) are useful for preparing the cylinder.

Positioned concentrically within and adjacent to the cylinder is a graphite electrical resistance heater tube. Within the graphite heater tube, there is concentrically positioned a cylindrical salt liner. The ends of the liner are fitted with salt plugs disposed at the top and the bottom.

Electrically conductive metal end discs are utilized at each end of the cylinder to provide electrical connection to the graphite heater tube. Adjacent to each disc is an end cap assembly each of which comprises a pyrophyllite plug or disc surrounded by an electrically conducting ring.

Operational techniques for simultaneously applying both high pressures and high temperatures in this type of apparatus are well known to those skilled in the super-pressure art. The charge assembly fits within the space defined by the salt liner and the salt plugs. The assembly consists of a cylindrical sleeve of shield metal selected from the group consisting of zirconium, titanium, tantalum, tungsten and molybdenum. Within the shield metal sleeve is a sub-assembly confined within a shield metal disc and a shield metal cup. The sample of material to be sintered is disposed within the cavity defined by the cup and the disc.

The single-crystal diamond is embedded in a matrix as described under Disclosure of Invention. A typical sub-assembly defined by shield metal cup 10 and shield metal disc 12 is shown in section in FIG. 1. The relatively large 20/25 mesh (about 850/710 micron) diamonds 14 are embedded in a mixture 16 of highly graphitized, ductile, powdered natural graphite and ungraded diamond particles (diamond fines) having a size range distributed between 1 and 85 microns with a peak at about 30–45 microns. A typical size range for the single crystal diamond is 10–40 mesh (1,700–425 microns). The sample of diamond in graphite is disposed between two graphite discs 18 and 19 (typically 0.76 mm thick) and two cobalt discs 22 and 23 (typically 0.10 mm thick).

The balance of the volume in the charge assembly is taken up with a disc made of the same material as the salt cylinder (.e.g., sodium chloride) and discs made of hexagonal boron nitride to minimize the entry of undesirable substances into the sub-assembly defined by the shield metal disc and cup.

The conditions for the HP/HT process are:

Pressure temperature conditions within the diamond stable region and above the catalyst melting point. Typical conditions are 52 Kbar at 1400° C. to 85 Kbar at 1750° C.; and A reaction time of three to 60 minutes.

The diamond stable region is in the range of pressure temperature conditions under which diamond is thermodynamically stable. On a pressure-temperature phase diagram, it is generally the high pressure side, above the equilibrium line between diamond and graphite.

The charge assembly is loaded into the reaction vessel which is placed in the HP/HT belt apparatus. First, the pressure and then the temperature are increased and held at the desired conditions for sufficient time for sintering to occur. The sample is then allowed to cool under pressure for a short period of time (typically 4 minutes), and finally the pressure is decreased to atmospheric pressure (typically over a 1 minute period), and the compact is recovered.

The shield metal sleeve can be manually removed. Any adhering metal from the shield metal cup or disc can be ground or lapped off. Distortion of surface irregularity may be removed in the same manner, and grinding is necessary to obtain optical clarity.

The invention will be further clarified by a consideration of the following example, which is intended to be purely exemplary.

EXAMPLE 1

HP/HT sintering runs were performed in accordance with the previous description and using sub-assemblies similar to that shown in FIG. 1. One run (SP-26) utilized 30/35 mesh (600/500 micron) diamond between two graphite discs, rather than the 20/25 mesh diamonds in graphite powder described previously.

The compacts were ground to expose the diamond crystals. Compacts made without the compressible matrix had some fractured crystals, while those made according to the improved processing disclosed herein were essentially free of damaged crystals.

Transmission measurements were made of the compacts made by the improved process of this invention on an infrared spectrophotometer. Similar measurements were also made on a control made from a mixture of 80% 20/25 mesh (850/710 micron) diamond and 20% diamond fines as described previously. The range of percent infrared transmission through the compact samples over the infrared spectrum (wave length of 2.5 microns to 13 microns) is shown in Table 1.

Other embodiments of this invention will be apparent to those skilled in the art from a consideration of this specification or practice of the invention disclosed herein. It is not intended that the invention be limited to the disclosed embodiments or to the details thereof, and departures may be made therefrom within the spirit and scope of the invention as defined in the following claims.

We claim:

1. An improved process for preparing a compact containing 10 to 40 mesh single crystal diamond by high pressure-high temperature sintering at pressure temperature conditions within the diamond stable region, wherein the improvement comprises isolating the single diamond crystals in a compressible matrix before exposing the mass of diamonds to high pressure-high temperature sintering conditions, said compressible matrix being selected from the groups consisting of:
   (A) a disc made of materials selected from graphite and carbide forming transition metals with compartments for holding individual diamond crystals;
   (B) a pair of graphite discs between which the single diamond crystals are disposed; and
   (C) a combination of (A) and (B).

2. The improved process as recited in claim 1 wherein the compressible matrix is a graphite disc with compartments for holding individual diamond crystals.

3. The improved process as recited in claim 1 wherein the compressible matrix is a pair of graphite discs between which the single diamond crystals are disposed.

4. The improved process as recited in claim 1 wherein the mass of single diamond crystals in the compressible matrix is sintered within a sub-assembly which comprises a shield metal cup and shield metal disc selected from the group consisting of zirconium, titanium, tantalum, tungsten, and molybdenum within which the mass of diamond and compressible matrix is disposed between two graphite discs and two cobalt discs.

5. The improved process as recited in claim 1 which further comprises grinding the compact until the single diamond crystals are exposed.

6. The improved process as recited in claim 1 wherein the single diamond crystals are in the size range of 10 to 35 mesh.

* * * * *

TABLE 1

Figure 2:
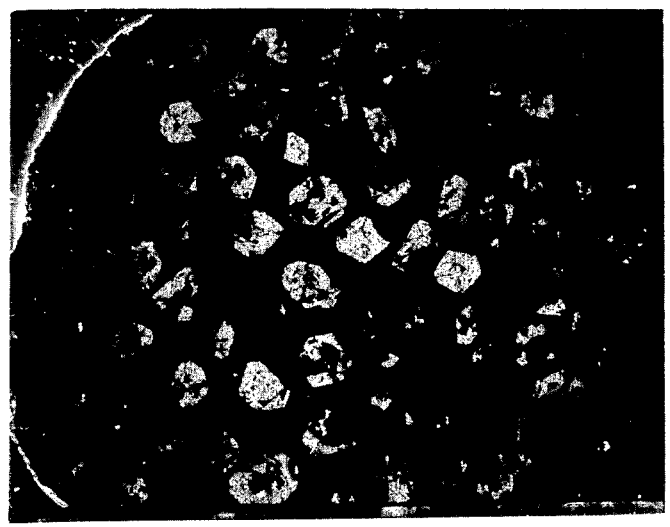
FIG. 2 is a photomicrograph (magnified 11.5x) which shows a compact made by the process of this invention using saw-type diamond of 20/25 mesh (850/710 micron) size embedded in a mixture of powdered graphite and diamond fines.
Figure 3:
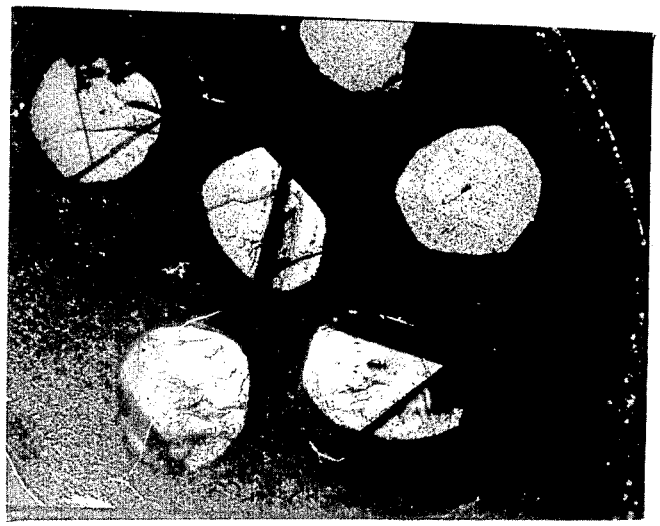
FIG. 3 is a photomicrograph (magnified 11.5x) showing another compact made by the improved process of this invention using 10 mesh (1.7 mm) natural diamond drill stones embedded in compartments in a graphite disc.

| | | Run Conditions | | | | |
|---|---|---|---|---|---|---|
| Sample | Compact Type | Press Time (Min.) | Pressure (Kbar) | Temperature (°C.) | Compact Thickness | Percent Transmittance Through Compact |
| 5121 | Control - 80% 20/25 mesh diamond + 20% diamond fines | 25 | 65 | 1600 | 0.41 mm | 10–18 |
| SP-19 | 20/25 Mesh diamond in powdered graphite & diamond fines all between 2 graphite discs (see FIG. 2) | 14.2 | 65 | 1600 | 0.36 mm | 15–26 |
| SP-26 | 30/35 Mesh diamond between 2 graphite discs | 15 | 65 | 1600 | 0.33 mm | 15–25 |

The minimum transmittance value represents the characteristic dips in the transmission curves occurring at wave lengths of about 5 microns and 7–8 microns where Type-I diamond absorbs infrared light.